United States Patent
Oh et al.

(10) Patent No.: US 11,378,184 B2
(45) Date of Patent: Jul. 5, 2022

(54) SYSTEM AND METHOD FOR ESTIMATING WHEEL SPEED OF VEHICLE

(71) Applicants: Hyundai Motor Company, Seoul (KR); Kia Motors Corporation, Seoul (KR)

(72) Inventors: Ji Won Oh, Gyeonggi-do (KR); Jeong Soo Eo, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 322 days.

(21) Appl. No.: 16/380,637

(22) Filed: Apr. 10, 2019

(65) Prior Publication Data

US 2020/0132192 A1  Apr. 30, 2020

(30) Foreign Application Priority Data

Oct. 24, 2018  (KR) .......................... 10-2018-0127191

(51) Int. Cl.
  *F16H 63/40*  (2006.01)
  *F16H 63/10*  (2006.01)
  *G01P 3/44*  (2006.01)

(52) U.S. Cl.
  CPC ............... *F16H 63/10* (2013.01); *G01P 3/44* (2013.01)

(58) Field of Classification Search
  CPC ....................................................... F16H 63/40
  USPC ....................................................... 73/115.08
  See application file for complete search history.

(56) References Cited

U.S. PATENT DOCUMENTS

| | | | |
|---|---|---|---|
| 2010/0318255 A1* | 12/2010 | Li | B60W 30/06 701/31.4 |
| 2017/0052208 A1* | 2/2017 | Reddy | H02P 6/16 |
| 2020/0325983 A1* | 10/2020 | Shariatmadar | F16H 59/44 |

* cited by examiner

*Primary Examiner* — Walter L Lindsay, Jr.
*Assistant Examiner* — Philipmarcus T Fadul
(74) *Attorney, Agent, or Firm* — Fox Rothschild LLP (57) ABSTRACT

A system and method for estimating a wheel speed of a vehicle are provided. The system includes wheel speed sensor that detects a rotation speed of a wheel of a vehicle and a motor speed sensor that detects a speed of the driving motor. A controller receives a signal of the wheel speed sensor, a signal of the motor speed sensor, and information regarding a gear stage indicating current gear stage status of the transmission, and estimates a wheel speed including direction information of wheel rotation.

17 Claims, 3 Drawing Sheets

SYSTEM AND METHOD FOR ESTIMATING WHEEL SPEED OF VEHICLE

CROSS REFERENCE TO RELATED APPLICATION

The present application claims priority to Korean Patent Application No. 10-2018-0127191, filed Oct. 24, 2018, the entire contents of which is incorporated herein for all purposes by this reference.

BACKGROUND

Field of the Invention

The present invention relates generally to a system and method for estimating a wheel speed of a vehicle and, more particularly, to a system and method for estimating a wheel speed of a vehicle, which overcome problems of typical wheel speed sensors, such as reduced resolution in a low-speed range and absence of information regarding the direction of rotation.

Description of the Related Art

In general, a vehicle includes a variety of sensors configured to detect various pieces of information necessary to control and operate a variety of related devices of the vehicle or to provide or display information. The necessary information includes information indicating a driving state, a vehicle state, states of in-vehicle devices, and the like, as well as environmental information indicating temperatures, humidity levels, luminous intensities inside and outside the vehicle, and the like.

In addition, the vehicle includes a variety of devices that are controlled and operated based on various information collected using the sensors. Such devices are disposed and used to provide basic driving performance of the vehicle, guarantee safety and driving reliability of the vehicle, protect a driver and passengers, reduce impact and noise, and improve convenience and ride comfort.

For example, the vehicle includes wheel speed sensors configured to detect rotation speeds of the wheels, i.e. wheel speeds, of the vehicle. Typical systems using signals of the wheel speed sensor may be an anti-lock brake system (ABS) that prevents wheel lock or slip when braking the vehicle, a traction control system (TCS) that prevents wheel slip by operating the engine or the brake during sudden departure or sudden acceleration of the vehicle, and the like.

Further, such systems may be an engine rotational speed sensor for configured to detect an engine speed, i.e. a speed of a driving source of an internal combustion engine (ICE) vehicle, a resolver configured to detect a motor speed, i.e. a speed of a driving source of an eco-friendly vehicle, a longitudinal acceleration sensor configured to detect a longitudinal acceleration of a vehicle, and the like. In-vehicle systems using signals of the resolver, the wheel speed sensor, the longitudinal acceleration sensor, or the like may be an anti-jerk system for that reduces vibration and impact, a hill-start assist control (HAC) system that prevents the vehicle from rolling back on a hill, and the like.

The wheel speed sensor among the sensors of the vehicle may include a tonewheel, a permanent magnet, a coil (or a Hall effect element), and the like. A plurality of teeth are provided on the outer circumferential surface of the tonewheel to cause a change in the magnetic field of the permanent magnet when the tonewheel rotates. The rotation speeds of the wheels of the vehicle (a wheel speed) may be determined by converting a change in the magnetic field into a pulsed electric signal and detecting the electric signal and this is information regarding a speed in which direction information of wheel rotation is unknown, as described below. However, the use of the wheel speed sensor has the following problems.

The wheel speed is important information for vehicle control. In a chassis control field, such as an anti-lock braking system (ABS), a traction control system (TCS), and a hill-start assist control (HAC) system, a vehicle is generally operated based on wheel speed information (not including information regarding the direction of rotation in a forward/reverse direction) detected by the wheel speed sensor or based on a vehicle speed calculated based on the wheel speed information.

In addition, the wheel speed has an essential function in a drive system-related control field, such as transmission control, torque command generation, or four wheel drive control. The resolution and accuracy of the wheel speed information must have a predetermined level or greater so that a control process based on the wheel speed may be optimally performed as intended. In particular, during the control process of the vehicle, rapid and accurate computation and determination in response to instantaneously-changing real-time situations are required. In this regard, in obtaining of information on which the computation and determination are performed, obtaining of sensor information accurately indicating a current real-time situation and rapid update of the information are important.

However, the resolution of the wheel speed (or angular velocity) measured by the sensor is proportional to the number of pulses (i.e. the number of movements of an encoder slit). Since a smaller number of pulses is better recognized at a relatively-low speed than at a relatively-high speed, a problem of reduced resolution occurs in the low-speed range.

Since the wheel speed sensor detects information by reading the number of pulse signals, generated by rotation of a tonewheel, in a predetermined time, a reading period of a predetermined level or higher is required. In particular, in the low-speed range in which the speed must be read by recognizing a smaller number of pulse signals, generation of a subsequent pulse after a previous pulse takes a longer period of time. Thus, no pulse signal may be present during such a reading period. Accordingly, in some cases in which the vehicle wheel rotates at a low speed without stopping, a wheel speed signal indicating a wheel speed may not be output, and the wheel speed information may not be obtained.

Wheel speed sensors currently used in vehicles are incremental encoder sensors. According to the characteristics of encoders, the wheel speed is calculated based on the number of pulses (i.e. the number of movements of the encoder slit) recognized per unit time. However, such a sensor does not output a wheel speed signal in a low-speed state of a vehicle, such as in creeping. Thus, the wheel speed information may indicate zero (0) although the vehicle wheel is clearly rotating even at an extremely low speed. In addition, when the vehicle is driving at a low speed as in creeping, the update period of the wheel speed information is slow. In particular, at an initial stage of creeping, i.e. an extremely slow driving state when the vehicle starts from a stopped position, an accurate speed is unable to be recognized since a wheel speed signal is not output.

Since the wheel speed is unable to be recognized without reading the number of pulses during a predetermined time, the update of information is necessarily slow. Even when an instantaneous change in the wheel speed has occurred, the current wheel speed is unable to be accurately recognized using the sensor. Accordingly, in the above-described control process required to respond to instantaneous real-time situations, it may be problematic when the sensor information is only used. For example, even when performing a known control process, such as an anti-jerk control process, to reduce noise and vibration caused by torsion and backlash by detecting a torsional status of the vehicle drive system, it may be impossible to obtain or use the wheel speed information in an extremely slow state.

As described above, although other sensors may be used for reading and controlling for a relatively-short period, the wheel speed sensor may have a problem of slower update of read information than the other sensors. Consequently, in the wheel speed sensor, accurate wheel speed information may not be reflected in the control in real time. In addition, since the signal of the incremental encoder does not include classification of the number of pulses according to the direction of the wheel rotation and the information regarding the direction of wheel rotation, directionality of wheel rotation is not determined by the signal. In other words, although the direction of wheel rotation when the gear stage is the drive (D) gear is opposite to the direction of wheel rotation when the gear stage is the reverse (R) gear, it is impossible to recognize the direction of wheel rotation only using the signal of the encoder wheel speed sensor.

For example, in a situation in which the anti-jerk control must be performed while the vehicle is driving at an extremely low speed, when a driver forcibly changes the gear stage from the D gear to the R gear, an accurate wheel state must be instantaneously detected during the change from the D gear (e.g. the first gear) to the R gear. However, it is impossible to recognize the direction of wheel rotation using the wheel speed sensor. Since a signal output by a typical wheel speed sensor does not include information regarding the direction of wheel rotation, i.e. information regarding the direction of rotation, for example, in the driving direction (forward direction) or the reverse direction (reverse direction), it may be impossible to determine whether the wheel is rotating in the driving direction (forward direction) or the reverse direction (reverse direction), based only on the signal of the wheel speed sensor.

The foregoing is intended merely to aid in the understanding of the background of the present invention, and is not intended to mean that the present invention falls within the purview of the related art that is already known to those skilled in the art.

SUMMARY

Accordingly, the present invention provides a system and method for estimating a wheel speed of a vehicle, which overcome problems of typical wheel speed sensors, such as reduced resolution in a low-speed range and absence of information regarding the direction of rotation. In particular, the present invention provides a system and method for estimating a wheel speed of a vehicle, in which directionality of wheel rotation may be more accurately determined from a signal of a motor speed sensor, and the wheel speed may be estimated using information regarding the direction of wheel rotation.

In order to achieve the above object, according to one aspect of the present invention, as a system including a driving motor and a transmission, and performing reverse movement using the transmission, a system for estimating a wheel speed of a vehicle may include: a wheel speed sensor configured to detect a rotation speed of a wheel of a vehicle; a motor speed sensor configured to detect a speed of the driving motor; and a controller configured to receive a signal of the wheel speed sensor, a signal of the motor speed sensor, and information regarding a gear stage indicating current gear stage status of the transmission, and estimate a wheel speed including directionality of wheel rotation.

Herein, the controller may include a direction determining module configured to obtain direction information indicating a direction of wheel rotation from motor speed information obtained from the signal of the motor speed sensor and the gear stage information. In addition, the controller may be configured to estimate the wheel speed including the directionality of wheel rotation, using real-time direction information obtained by the direction determining module and the signal of the wheel speed sensor.

According to another aspect of the present invention, as a method including a driving motor and a transmission, and performing reverse movement using the transmission, a method of estimating a wheel speed of a vehicle may include: receiving, by a controller, a signal of a wheel speed sensor, a signal of a motor speed sensor, and information regarding a gear stage indicating a current gear stage status of the transmission; obtaining, by the controller, motor speed information obtained from the signal of the motor speed sensor by the direction determining module and the direction information indicating a direction of wheel rotation from the information regarding the gear stage; and estimating, by the controller, a wheel speed including the directionality of wheel rotation, using the real-time direction information obtained by the signal of the wheel speed sensor and the direction determining module.

As described above, the wheel speed estimating system and method according to the present invention may obtain more accurate wheel speed information in a relatively-short update period of time. Even when the vehicle is driving at an extremely low speed as in creeping, a more accurate wheel speed value reflecting an actual situation of the wheel may be obtained as real-time information. In addition, through the system and method for estimating the wheel speed of the vehicle according to the present invention, direction of wheel rotation may be more accurately determined from the signal of the motor speed sensor, and the wheel speed may be estimated using the information regarding the direction of the wheel rotation.

In particular, in the wheel speed estimating system and method according to the present invention, a wheel speed value including real-time rotation direction information may be obtained from, for example, a case in which the driver inputs a reverse driving input (i.e. performs an R gear manipulation) during a low-speed driving. Consequently, it may be possible to overcome the problems occurring when only the wheel speed sensors are used, such as reduced resolution in a low-speed range and absence of information regarding the direction of rotation.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Hereinafter, exemplary embodiments of the present invention will be described in detail with reference to the accompanying drawings so that a person having ordinary skill in the art to which the present invention relates could easily put the present invention into practice. However, the present invention is not limited to the exemplary embodiments described herein and may be embodied in other forms.

The present invention relates to a system and method able to obtain information regarding a wheel speed including information regarding the direction of rotation (i.e. information regarding a direction of wheel rotation) in a driving direction and a reverse direction using a signal of a motor speed sensor. As described above, it may be difficult to obtain an accurate value of the wheel speed of the vehicle as real-time information having a relatively-short update period, using only a typically-used wheel speed sensor. In particular, when the vehicle travels at a low speed as in creeping, it may be difficult to measure the wheel speed using the wheel speed sensor. Accordingly, as a solution to this matter, information regarding the wheel speed (hereinafter, referral to as "wheel speed information"), converted from a driving source speed of the vehicle based on information regarding a gear ratio of a transmission, may be used.

As described above, using only known wheel speed sensor it may be impossible to obtain the wheel speed information including information regarding the direction of rotation of wheel (hereinafter, referred to as "direction information of wheel rotation"). Thus, a driving source speed sensor configured to detect a driving source speed is additionally used in the present invention. In particular, the driving source speed of the vehicle may be a speed of an engine or a motor connected to an input side of the transmission, i.e. a speed of an engine of an internal combustion engine (ICE) vehicle or a speed of a motor of an eco-friendly vehicle, such as an electric vehicle (EV), a fuel cell vehicle (FCV), or a hybrid electric vehicle (HEV).

It may be possible to convert and change the driving source speed of the vehicle into a wheel speed (i.e. an equivalent speed at a wheel), based on a gear ratio that corresponds to a current gear stage of the transmission. In the present invention, a speed, which is obtained by converting the driving source speed of the vehicle detected through the driving source speed sensor to a speed at the wheel using information regarding gear ratio of transmission, i.e. a gear ratio conversion speed, may be used to estimate the wheel speed.

In a typical eco-friendly vehicle, the speed of the motor, i.e. the vehicle driving source, may be measured using a resolver, i.e. a motor speed sensor. Real-time information indicating the motor speed and also the direction of rotation of the motor may be accurately obtained using the resolver. Accordingly, when the speed of the motor measured using the resolver is converted and changed based on the gear ratio, the wheel speed information (i.e. gear ratio conversion speed) may be obtained more accurately.

Although an accurate speed may be measured using the resolver, it may be difficult to measure an accurate speed in real time using the wheel speed sensor. Thus, by converting the motor speed, measured by the resolver, into the speed at the wheel based on the gear ratio, a necessary wheel speed (i.e. a gear ratio conversion speed) may be obtained. However, the gear ratio conversion speed cannot be used to detect torsion in a drive shaft or a backlash in a drive system.

Described in more detail, the torsion in the drive shaft or the backlash in the drive system refers to torsion or backlash between a motor, i.e. a vehicle driving source, and a wheel. The torsion or backlash may be detected as a difference between a gear ratio conversion speed, i.e. a speed at the wheel obtained by converting the motor speed based on the gear ratio, and an actual speed of the wheel. However, the actual speed of the wheel cannot be replaced by the gear ratio conversion speed. In other words, although the torsion or backlash must be detected by a magnitude equal to the difference between the gear ratio conversion speed and the actual wheel speed, no speed difference may be obtained, since the gear ratio conversion speed and the actual wheel speed are regarded the same when the gear ratio conversion speed is used in place of the actual wheel speed.

Accordingly, to detect the torsion or backlash, a signal indicating the motor speed and a signal indicating the wheel speed must be present individually. Torsion at a low speed or torsion in anti-jerk control or the like is unable to be detected unless the actual wheel speed is obtained individually, instead of being converted from the motor speed. In particular, the torsion is unable to be detected in comparison to the motor speed, i.e. the driving source speed, unless the real-time wheel speed information indicating the actual wheel speed regardless of speed conditions, such as an extremely low speed as in creeping, is obtained accurately.

Accordingly, the present invention provides the system and method by which a wheel speed in an actual situation may be more accurately obtained as real-time information having a relatively-short update period and, in particular, wheel speed information additionally indicating the direction of wheel rotation may be obtained.

Figure 1:
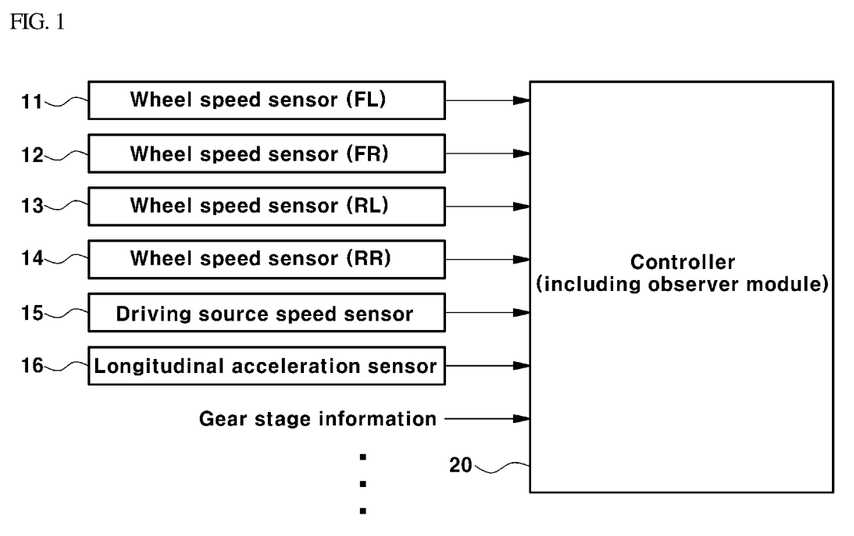
FIG. 1 is a block diagram illustrating a configuration of a system for estimating a wheel speed according to an exemplary embodiment of the present invention.
Figure 2:
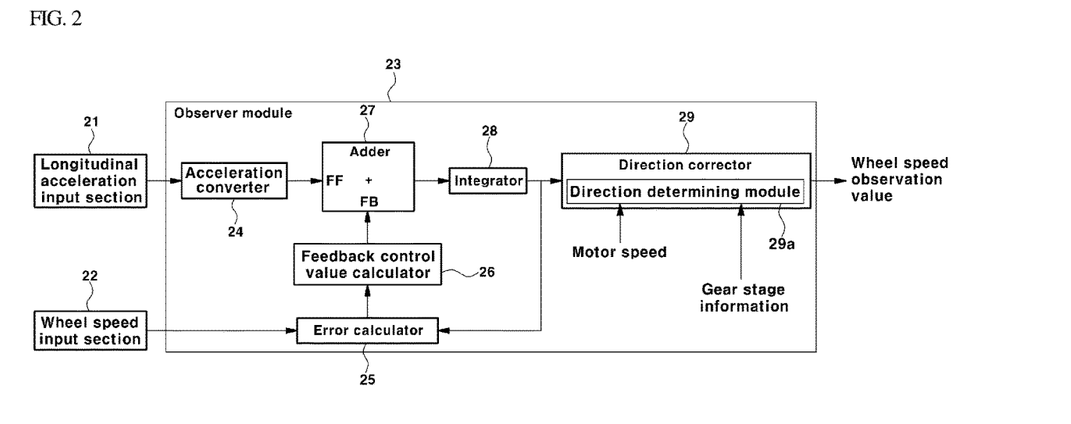
FIG. 2 is a block diagram specifically illustrating an internal configuration of the controller of the system for estimating a wheel speed according to an exemplary embodiment of the present invention.
Figure 3:
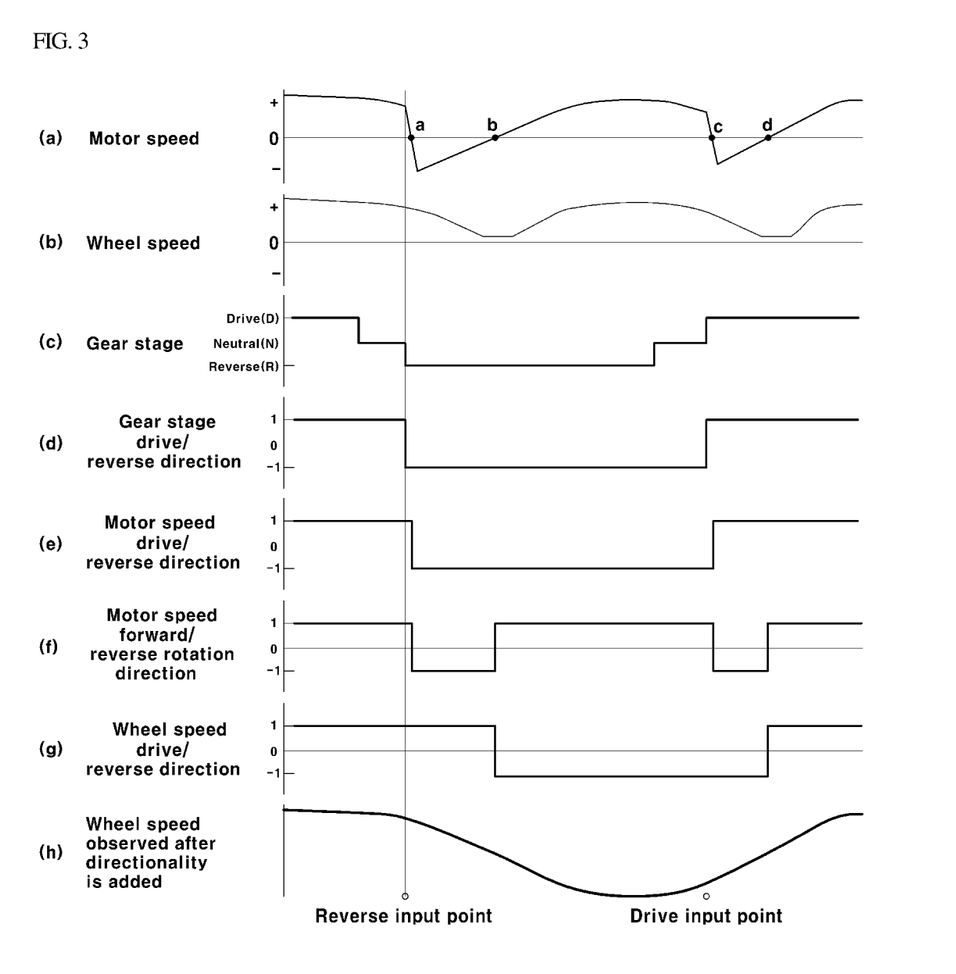
FIG. 3 is a diagram illustrating a motor speed, wheel speed information, and gear stage information, used in the wheel speed estimation process according to an exemplary embodiment of the present invention, as well as a finally estimated wheel speed.

FIG. 1 is a block diagram illustrating a configuration of a system for estimating a wheel speed according to an exemplary embodiment of the present invention, and FIG. 2 is a block diagram specifically illustrating an internal configuration of the controller of the system for estimating a wheel speed according to an exemplary embodiment of the present invention. In addition, FIG. 3 is a diagram illustrating a motor speed, wheel speed information, and gear stage information, used in the wheel speed estimation process according to an exemplary embodiment of the present invention, as well as a finally estimated wheel speed.

Referring to FIG. 1, the system for estimating a wheel speed according to an exemplary embodiment of the present invention may include wheel speed sensors 11 to 14, a driving source speed sensor 15, a longitudinal acceleration sensor 16, and a controller 20. Herein, the wheel speed sensors 11 to 14 may be known sensors disposed on the wheels of a vehicle to respectively detect a wheel speed of the corresponding wheel.

The wheel speed sensors 11 to 14 may be disposed on driving wheels to which power is supplied by the vehicle driving source, such as an engine or a motor, and more particularly, may be wheel speed sensors disposed on the front wheels in a front wheel drive (FWD) vehicle or wheel speed sensors disposed on the rear wheels in a rear wheel driver (RWD) vehicle. Particularly, a wheel speed finally estimated according to the present invention is a rotation speed of a driving wheel, estimated using a signal of one of the wheel speed sensors 11 to 14 disposed on the corresponding wheel.

In addition, in a four-wheel drive (FWD) vehicle in which power of the vehicle driving source is supplied to the front wheels and the rear wheels, the wheel speed sensors 11 to 14 may be disposed on the front wheels and the rear wheels. The wheel speed finally estimated according to the present invention is equal to a rotation speed of each of the four wheels, estimated using the signal of one of the wheel speed sensor 11 to 14 disposed on the corresponding wheel.

FIG. 1 illustrates an exemplary configuration in a four-wheel drive vehicle in which the wheel speed sensors 11 to 14 disposed on the front left wheel FL, the front right wheel FR, the rear left wheel RL, and the rear right wheel RR may be used. Although the final wheel speed is estimated using the signal of one of the wheel speed sensors 11 to 14 disposed on the corresponding wheels according to the present invention, problems occurring when only the wheel speed sensors 11 to 14 are used may be overcome. In other words, problems, such as reduced resolution in a low-speed range and absence of information regarding the direction of rotation, may be overcome. Accordingly, the final wheel speed estimated according to the present invention is an actual wheel speed more accurately representing a real-time situation than values detected by the wheel speed sensors 11 to 14, and is real-time information obtained at a shorter update period than when only the wheel speed sensors 11 to 14 are used.

The driving source speed sensor 15 may be configured to detect the rotation speed of the driving source of the vehicle. More particularly, the driving source speed sensor 15 may be configured to more accurately measure the speed of the engine of the vehicle driving source as real-time information at the input side of the transmission (in an internal combustion engine vehicle) or to more accurately measure the speed of the motor as real-time information at the input side of the transmission (in an eco-friendly vehicle). The driving source speed sensor 15 in the eco-friendly vehicle may be a known motor speed sensor, i.e. a resolver, configured to output a signal indicating the speed of the motor and the direction of rotation of the motor in real time.

In addition, in a vehicle in which the vehicle driving source is connected to the input side of the transmission, the driving source speed measured by the driving source speed sensor 15 is a speed of an input shaft of the transmission. When the speed of rotation and the direction of rotation are able to be accurately detected by the sensor, hereinafter, the speed of the input shaft of the transmission may be used in place of the driving source speed of the vehicle (e.g. the motor speed).

Furthermore, in a position in which a hybrid starter and generator (HSG) is connected to the wheels in a power-transmittable manner, the speed of the HSG detected by a separate sensor (i.e. a resolver) may be used in place of the driving source speed of the vehicle. In addition, the longitudinal acceleration sensor 16 may be a known sensor (e.g. an inertia sensor) disposed to detect a longitudinal acceleration of the vehicle. The above-described system and method for estimating a wheel speed according to the present invention may use the wheel speed sensors 11 to 14, the driving source speed sensor 15, and the longitudinal acceleration sensor 16 as known sensors disposed on the vehicle.

Furthermore, the controller 20 may be configured to receive measurements of the wheel speed, motor speed, and longitudinal acceleration, obtained from signals of the sensors 11 to 14, and estimate the wheel speed based on the measurements. In particular, the controller 20 may include a set of software installed and executed to estimate the wheel speed on the basis of the measurements of the sensors. Notably, the controller 20 may be specifically programmed to execute the processes described herein. Accordingly, the controller 20 may be configured to estimate the wheel speed from the measurements of the sensors according to a process and method defined by the algorithm of the software. According to an exemplary embodiment of the present invention, the controller 20 may include an observer module 23 configured to estimate the wheel speed, as will be described later.

Described in more detail about the configuration of the controller 20 according to an exemplary embodiment referral to in FIG. 2, the controller 20 may include a longitudinal acceleration input section 21, a wheel speed input section 22, and the observer module 23. First, the longitudinal acceleration input section 21 may be configured to receive a signal from the longitudinal acceleration sensor 16 and obtain real-time longitudinal acceleration information of the vehicle, which will be used by the observer module 23, from the received signal.

The longitudinal acceleration input section 21 may be disposed on and connected to an input side of the observer module 23 to input the real-time longitudinal acceleration information, obtained from the signal of the longitudinal acceleration sensor 16, to the observer module 23. Since the signal of the longitudinal acceleration sensor 16 used for wheel speed estimation according to the present invention includes gradient components, such as a pitch angle of the vehicle suspension and a road slope, it may be necessary to obtain information regarding a signal value of the longitudinal acceleration sensor 16, from which the gradient components are removed by correction, i.e. real-time information indicating pure longitudinal acceleration of the vehicle.

Accordingly, the longitudinal acceleration input section 21 may be configured to obtain the longitudinal acceleration information of the vehicle based on the signal value of the longitudinal acceleration sensor 16. The longitudinal acceleration input section 21 may be configured to obtain the longitudinal acceleration information, in which the signal value is additionally corrected by a preset separate model or logic for gradient or load correction, based on additional information (possibly including sensor information), such as set information stored in the longitudinal acceleration input section 21, real-time vehicle speed information, and vehicle load information.

In a typical vehicle, the longitudinal acceleration sensor is used to obtain road slope (or gradient) information. As is known in the art, there are methods of obtaining the road slope by removing longitudinal acceleration components of the vehicle from the signal of the longitudinal acceleration sensor or, on the contrary, obtaining pure longitudinal acceleration value information of the vehicle by removing the gradient components. As described above, any one of a plurality of known methods, such as the above-described correction method, may be employed and used to obtain pure longitudinal acceleration value information of the vehicle according to the present invention, as long as the method is capable of obtaining pure longitudinal acceleration value information of the vehicle, from which the gradient components are removed, from the signal value of the longitudinal acceleration sensor.

As additionally described above, the longitudinal acceleration input section 21 may be configured to obtain the longitudinal acceleration information including a pure longitudinal acceleration component of the vehicle, from which the gradient components are removed, and then output the longitudinal acceleration information to be input to the observer module 23. In addition, the wheel speed input section 22 is a component configured to obtain the wheel speed information, which will be used in the observer module 23, from the signals of the wheel speed sensors 11 to 14 attached to the wheels.

The wheel speed input section 22 may be disposed on and connected to the input side of the observer module 23, such that the wheel speed input section 22 may input wheel speed information, obtained from the signals of the wheel speed sensors 11 to 14, to the observer module 23. According to an exemplary embodiment, the wheel speed information obtained only using the signals of the wheel speed sensors 11 to 14 may be replaced by the wheel speed information corrected additionally using the signal of the motor speed sensor (i.e. the resolver).

In other words, although the wheel speed input section 22 may be configured to obtain a wheel speed estimation value, which will be used as an input to the observer module 23, only using the signal of each of the wheel speed sensor 11 to 14, the wheel speed input section 22 may also be configured to obtain the wheel speed estimation value corrected using both the signal of each of the wheel speed sensors 11 to 14 and the signal of the motor speed sensor (or resolver) 15. Particularly, the wheel speed input section 22 may be configured to obtain the corrected wheel speed information to be a value produced by multiplying the wheel speed (not including direction information) obtained from the signal of each of the wheel speed sensors 11 to 14 and the gear ratio conversion speed with weights, respectively, and then sum the resultant products.

The gear ratio conversion speed is an equivalent wheel speed obtained by converting the motor speed, obtained from the signal of the motor speed sensor (or resolver) 15, into a speed at the wheel based on a gear ratio that corresponds to the current gear stage of the transmission. In other words, the wheel speed estimation value to be input to the observer module 23 may be determined by a weighted summation method in which the wheel speed obtained from the signal of each of the wheel speed sensors 11 to 14 and the gear ratio conversion speed finally obtained from the signal of the motor speed sensor 15 are multiplied with predetermined weights, respectively, and then are summed. In particular, values of the weights may be set such that a total of the two weights, i.e. the weight multiplied to the wheel speed and the weight multiplied to the gear ratio conversion speed, is one (1). Optimum values experimentally obtained by a preceding test may be used as the weights.

According to an exemplary embodiment, the weights may vary depending on the wheel speed or the gear ratio conversion speed. Weight values that correspond to the wheel speed or the gear ratio conversion speed may be selected and determined to be used. The lower the speed (or velocity) is, the smaller the value to which the weight multiplied to the wheel speed measured by the sensors 11 to 14 is set may be, while the greater the value to which the weight multiplied to the gear ratio conversion speed is set may be.

Accordingly, the portion of the motor speed (i.e. the portion of the gear ratio conversion speed) in the wheel speed estimation value calculated by the weighted summation method is increased in the low-speed range, whereas the portion of the wheel speed measured by the sensors 11 to 14 (i.e. the measurements of the wheel speed sensors) may be increased in a higher-speed range in which the resolution of the wheel speed sensors 11 to 14 is sufficiently high. In addition, when the wheel speed is used, when no signals are output from the wheel speed sensors 11 to 14 since the vehicle travels extremely slowly, the wheel speed or the weight may be regarded as zero (0). Thus, the gear ratio conversion speed may be input to an error calculator 25 of the observer module 23, which will be described later, as the wheel speed information to be used in calculation of a speed error.

The wheel speed input section 22 may use absolute values, i.e. positive values, for both the wheel speed and the gear ratio conversion speed to which the weights are applied. In addition, the observer module 23 may include an acceleration converter 24, the error calculator 25, a feedback control value calculator 26, an adder 27, an integrator 28, and a direction corrector 29. First, the observer module 23 may be configured to require two types of inputs, which are two types of input information regarding feedforward (FF) and feedback (PB). One of the two types of input information is the longitudinal acceleration information of the vehicle input via the longitudinal acceleration input section 21, while the other of the two types of input information is information regarding the wheel speed estimation value input via the wheel speed input section 22.

In the observer module 23, the acceleration converter 24 may be configured to convert feedforward-related input information, i.e. the real-time longitudinal acceleration information of the vehicle input via the longitudinal acceleration input section 21, into wheel acceleration based on the tire radius (or rolling radius). According to an exemplary embodiment of the present invention, the real-time longitudinal acceleration of the vehicle may be divided by a tire rolling radius value to be changed into the wheel acceleration. The tire rolling radius value may be a corrected value obtained by correcting a previous tire rolling radius value based on motor speed information.

In particular, a difference between a changed speed, obtained by changing a previous wheel speed estimated (or observed) by the observer module 23 into a speed at the motor based on gear ratio information of the current gear stage, and an actual motor speed, measured by the motor speed sensor in real time, may be integrated. Then, the corrected value may be obtained by correcting the previous tire rolling radius value to increase or decrease, based on an integrated value.

In addition, the error calculator 25 has feedback-related input information, i.e. the wheel speed estimation value input via the wheel speed input section 22, as an input, while receiving a previous wheel speed observation value estimated by the observer module 23 as a feedback value, thereby calculating the speed error, i.e. a difference value between the wheel speed estimation value and the previous wheel speed observation value. In other words, when the wheel speed input section 22 inputs the wheel speed measured by the wheel speed sensors 11 to 14, the gear ratio conversion speed, and the wheel speed estimation value determined based on the weight to the observer module 23, the error calculator 25 may be configured to calculate the speed error between the wheel speed estimation value and the wheel speed observation value, i.e. the feedback value.

As described above, when the wheel speed input section 22 is configured to input the wheel speed value, obtained from the signal of each of the wheel speed sensors 11 to 14, to the observer module 23 as the wheel speed estimation value without using the gear ratio conversion speed and the weight, i.e. when the wheel speed value is used as an input to the observer module 23, the error calculator 25 of the observer module 23 may be configured to calculate the speed error between the wheel speed value and the wheel speed value, i.e. the feedback value. The feedback control value calculator 26 may then be configured to calculate a feedback control value of an acceleration dimension, with which the speed error (i.e. an observer error), calculated and input by the error calculator 25, converges to 0.

Particularly, the feedback control value calculator 26 may be configured to calculate a control value for correcting the speed error, calculated and input by the error calculator 25, by having the speed error as an input. The feedback control value calculator 26 may be referred to as a feedback error controller configured to calculate and output a control value for setting the speed error to 0. According to an exemplary embodiment of the present invention, the feedback control value calculator 26, which may be referred to as the feedback error controller, may be one selected from among a P-gain control, an I-gain control, a map-based control, and a composite control configuration in which the P-gain control, the I-gain control, the map-based control are combined in parallel.

As in the theoretical concept of the controller, a physical difference is considered to be present among a control input, a control feedback, and a control target. This accordingly provides a degree of freedom, by which the dimension of the feedback control input may not be necessarily limited to the acceleration dimension. According to an exemplary embodiment of the present invention, the feedback gain of the feedback control value calculator 26 may vary depending on the wheel speed measured by the wheel speed sensors 11 to 14. The feedback gain may be determined as a function of wheel speed. For example, at a lower wheel speed in which the accuracy of detection is lower, the feedback gain may be smaller.

Consequently, the speed error calculated by the error calculator 25 is the observer error. The feedback control value calculator 26, i.e. the feedback error controller, may be configured to calculate a feedback control value that corresponds to the observer error by having the observer error as a feedback input. In addition, according to the present invention, the feedback control value may be used as a compensation value, with which the wheel acceleration output by the acceleration converter 24 is compensated for. Compensation for the wheel acceleration may be performed by adding the wheel acceleration output by the acceleration converter 24 and the feedback control value, i.e. the compensation value.

In other words, in the observer module 23, when the wheel acceleration information output by the acceleration converter 24 is input to the adder 27, i.e. the compensator, as feedforward acceleration information, and at the same time, the feedback control value output by the feedback control value calculator 26 is input to the adder 27 as feedback acceleration information, the adder 27 may be configured to add the wheel acceleration, i.e. a feedforward acceleration value, and the feedback control value of the error controller 20. In addition, the adder 27 may be configured to output the added wheel acceleration to the integrator 28.

The integrator 28 of the observer module 23 may be configured to calculate the wheel speed by integrating the wheel acceleration input by the adder 27. The wheel speed calculated by the integrator 28 may be directed to pass through the direction corrector 29, which finally provides the directionality to the wheel speed depending on the direction of wheel rotation, to thus obtain a final wheel speed observation value based on which the vehicle may be operated. Consequently, in the observer module 23, the wheel speed (not including the direction information indicating the direction of wheel rotation) output by the integrator 28 may be corrected by the direction corrector 29, and thus, a finally-estimated wheel speed, i.e. a final wheel speed observation value as real-time information, may be obtained. The final wheel speed observation value is a wheel speed including information regarding the direction of wheel rotation (i.e. the direction information).

The final wheel speed observation value obtained by the controller 20 is a wheel speed value including the direction information. The direction corrector 29 of the observer module 23 provides the directionality to the wheel speed, output by the integrator 28, depending on the direction of wheel rotation. According to an exemplary embodiment of the present invention, the direction corrector 29 may be configured to determine the final wheel speed observation value, to which the directionality due to the direction of wheel rotation is provided, from the motor speed, the wheel speed, and gear stage information.

The motor speed used by the direction corrector 29 to add the direction information depending on the actual direction of wheel rotation to the wheel speed is a real-time motor speed detected by the motor speed sensor (or resolver) 15. In addition, the wheel speed used by the direction corrector 29 to determine the final wheel speed observation value, i.e. the wheel speed to which the directionality is not yet provided, is a wheel speed calculated and output by the integrator 28. In addition, when the direction corrector 29 provides the directionality to the wheel speed, different methods may be applied to vehicles realizing the reverse driving using the transmission and vehicles, among eco-friendly vehicles, realizing the reverse driving by reversely rotating the motor without shifting of the transmission. When the motor rotates, the known resolver 15, i.e. the motor speed sensor 15, may be configured to output a signal indicating a speed of the motor rotation and also a direction of the motor rotation.

Accordingly, in a vehicle realizing the reverse driving by simply rotating the motor reverse without shifting of the transmission, the direction corrector 29 may be configured to check whether there is a reverse driving input of the driver based on the gear stage information, obtain real-time direction information of the motor from the signal of the resolver 15, and determine the final wheel speed observation value including information regarding the direction of rotation by adding the direction information of the motor to the wheel speed output by the integrator 28.

In contrast, in the vehicle realizing the reverse driving using the transmission, the motor speed and the actual wheel speed of the vehicle vary depending on the gear stage, and the correlation between the current gear stage and the direction of wheel rotation is insufficient due to intervention of a neutral range before or after shifting, synchronizer slip in a motor reverse rotation range, and the like. Accordingly, a strategy is required to provide the directionality to the wheel speed. This will be described in detail with reference to FIG. 3.

FIG. 3 illustrates an example in which the driver changes the gear stage to the reverse gear by manipulating a shift lever during forward movement of the vehicle at a low speed and then changes the gear stage to the drive gear during reverse movement of the vehicle (i.e. the gear stage changes from the D gear to the R gear and then to the D gear). A case in which the driver changes the gear stage to the reverse gear while the vehicle is moving forwards even at a low speed without completely stopping, as in FIG. 3, is infrequent. In addition, a case in which the driver changes the gear stage to the drive gear while the vehicle is moving reverse even at a low speed without completely stopping is also infrequent.

However, if such a case occurs, power train components, such as the transmission, may be damaged. Thus, when the gear stage is changed between the drive gear and the reverse gear before the vehicle is completely stopped, as in a case in which the gear stage is input as the reverse gear or the drive gear, a typical vehicle has a control process of rotating the motor, i.e. the vehicle driving source, in the reverse direction and then in the forward direction.

In the system for estimating a wheel speed according to the present invention, the direction corrector 29 of the observer module 23 may include a direction determining module 29a configured to obtain the real-time direction information corresponding to the actual direction of rotation of the wheel speed, as in FIG. 2, based on the motor speed and the gear-shift stage information of the transmission. In addition, the direction corrector 29 may be configured to determine a final wheel speed observation value (i.e. a final estimation value) by adding the obtained the direction information obtained by the direction determining module 29a to the wheel speed output by the integrator 28.

Accordingly, a wheel speed may be estimated by including the direction information to the wheel speed output by the integrator 28. In addition, although not illustrated, the wheel speed may also be estimated by including the direction information to the rotation speed of the wheel obtained from the signal of the wheel speed sensor. Therefore, the present invention also includes determining the wheel speed value by multiplying the rotation speed of the wheel detected by the wheel speed sensor as described above with the direction information, i.e. information regarding the drive/reverse direction of wheel speed (hereinafter, referred to as the "wheel speed drive/reverse direction information") obtained as a value of '+1' or '−1' as described below.

In FIG. 3, graph (a) indicates a motor speed measured by the resolver 15. The real-time motor speed information obtained by the resolver 15 may be input to the direction determining module 29a of the direction corrector 29, as illustrated in FIG. 2. In addition, the real-time motor speed information may be used to obtain the direction information of wheel rotation with the gear stage information in the direction determining module 29a As apparent from the drawing, the motor speed information (a), obtained from the signal of the resolver 15, may include the direction information indicating the direction of rotation of the motor.

According to the known resolver 15, the motor speed information to which the directionality of forward/reverse rotation is added may be obtained. Referring to the motor speed (a) illustrated in FIG. 3, when the driver manipulates the gear stage in the reverse gear through the shift lever during low-speed forward movement of the vehicle and when the driver manipulates the gear stage to the drive gear during low-speed reverse movement of the vehicle, it may be appreciated that the motor, i.e. the vehicle driving source, rotates forward after having rotated in reverse.

In other words, when the driver performs a manipulation of changing the gear stage to the reverse gear during forward rotation of a driving motor, a control process of rotating the motor reverse after motor speed deceleration in a short period of time at a point in time at which the gear change to the reverse gear is completed ("reverse input point" in FIG. 3) and then rotating the motor forward after motor speed deceleration may be performed. In graph (a) of FIG. 3, a motor speed having a positive (+) value indicates a forward rotation of the motor, and a motor speed having a negative (−) value indicates a reverse rotation of the motor. In addition, in graph (a) of FIG. 3, "a", "b", "c", and "d" relatively indicate a point in time of changing a rotation direction of the motor and a point in time of motor speed zero-crossing while changing the rotation direction of the motor.

The point in time of first motor speed zero-crossing "a" is a point in time at which the motor starts reverse rotation acceleration after forward rotation deceleration, and the point in time of second motor speed zero-crossing "b" is a point in time at which the motor restarts forward acceleration after reverse rotation deceleration. Right after the point in time of first motor speed zero-crossing "a", the vehicle is in a state of moving forwards, the motor is in a state of rotating reverse, longitudinal acceleration has a positive (+) value, and the gear stage is changed to the reverse gear.

In addition, before the second motor speed zero-crossing, even when the motor is in reverse rotation deceleration and the gear stage is in the reverse gear (i.e. R gear), the vehicle only decelerates in a low-speed forward movement state. The vehicle actually starts moving backwards from a point in time at which the motor starts rotating forward after the second motor speed zero-crossing. In other words, the point in time of second motor speed zero-crossing "b", i.e. a point in time at which the motor resumes forward rotation, is a point in time at which the vehicle starts reverse movement. After this point, even if the motor rotates forward, the vehicle continues reverse movement since the gear stage is in the reverse gear (i.e. R gear).

Afterwards, when the driver performs a manipulation changing the gear stage from the reverse gear (i.e. R gear) to the drive gear (i.e. D gear), a control process of rotating the motor reverse after motor speed deceleration in a short period of time at a point in time at which the gear change to the drive gear is completed ("drive input point" in FIG. 3) and then rotating the motor forward after motor speed deceleration may be performed. In graph (a) of FIG. 3, a point in time of third motor speed zero-crossing "c" is a point in time at which the motor starts reverse rotation acceleration after forward rotation deceleration, and a point in time of fourth motor speed zero-crossing "d" is a point in time at which the motor restarts forward acceleration after reverse rotation deceleration.

In addition, before the fourth motor speed zero-crossing, even when the motor is in reverse rotation deceleration and the gear stage is in the drive gear (i.e. D gear), the vehicle only decelerates in a low-speed reverse movement state. The vehicle actually starts moving forwards from a point in time at which the motor starts rotating forward after the fourth motor speed zero-crossing. In other words, the point in time of fourth motor speed zero-crossing "d", i.e. a point in time at which the motor resumes forward rotation, is a point in time at which the vehicle starts forward movement. After this point, the vehicle moves forwards when the motor rotates forward, since the gear stage is in the drive gear (i.e. D gear).

Further, graph (b) in FIG. 3 indicates wheel speed information obtained by the wheel speed input section 22 using the signal of each of the wheel speed sensors 11 to 14. In an exemplary embodiment in which the wheel speed input section 22 may be configured to calculate a wheel speed estimation value by the weighted summation method of multiplying a wheel speed and a gear ratio conversion speed with weights, respectively, and add the resultant products, the wheel speed multiplied with the weight is the wheel speed information (b).

As apparent from graph (b) in FIG. 3, the wheel speed information obtained from the signal of each of the wheel speed sensors 11 to 14 does not include the direction information indicating the direction of wheel rotation. Additionally, referring to graph (b) in FIG. 3, about when the motor resumes forward rotation after reverse rotation deceleration, the wheel speed exhibits a lowest point in a positive (+) value without zero-crossing. After that, an increase in the wheel speed indicates an increase in the reverse speed as the vehicle moves in reverse. Even when the gear stage is converted between the drive and the reverse and between the reverse and the drive as described above, the signal of each of the wheel speed sensors 11 to 14 always indicates a positive (+) value like an absolute value, since the signal includes no direction information.

Graph (c) in FIG. 3 indicates gear stage information representing actual gear stage status of the transmission when the driver manipulates the shift lever in the order of the drive gear, the reverse gear, and the drive gear (i.e. D gear R gear D gear). As illustrated in the drawing, a neutral position (N) is present between before and after shifting. The gear stage information, such as graph (b) in FIG. 3, may be information that the controller of the wheel speed estimating system according to the present invention receives from another controller configured to collect the gear stage information in real time, for example, a transmission control unit (TCU). Particularly, the transmission control unit (TCU) in a typical vehicle is configured to receive information regarding the manipulation of the shift lever when the driver manipulates the shift lever. In addition, the transmission control unit (TCU) may be configured to receive real-time information regarding operation states from the transmission while performing shift control to operate the transmission in response to the driver manipulating the shift lever or based on driving conditions of the vehicle.

Particularly, the controller according to the present may be configured to receive real-time information indicating one of the drive gear stage status, the neutral gear stage status, and the reverse gear stage status (e.g. drive, neutral, and reverse positions) of the transmission, i.e. the gear stage information, from the TCU. The direction determining module 29a of the direction corrector 29 according to the present invention may be configured to obtain information (d), by which gear stage status is categorized into the drive direction and the reverse direction, by applying a relay function to the gear stage information (c).

In other words, the direction determining module 29a of the direction corrector 29 may be configured to obtain information regarding the drive/reverse direction of the gear stage (hereinafter, referred to as the "a gear stage drive/reverse direction"), indicated by graph (d), from the gear stage information (c) by assigning "+1" to a status in which the gear stage is converted to the drive gear from the reverse gear after termination of the neutral position and "−1" to a status in which the gear stage is converted to the reverse gear (R) from the drive gear (D) after termination of the neutral position (N).

Afterwards, at a point in time at which the rotation direction of the motor is changed after gear shifting, based on the motor speed information (a), i.e. a point in time of the motor speed zero-crossing after checking a point in time of the motor speed zero-crossing, the direction determining module 29a of the direction corrector 29 may be configured to convert motor speed drive/reverse direction information (e) to match with the information regarding the gear stage drive/reverse direction (d).

In particular, the direction determining module 29a may be configured to check a point in time at which the rotation direction of the motor is changed after gear stage change based on the motor speed information (a), and check completion of drive/reverse direction change of the gear stage (i.e. gear shifting to the reverse gear or the drive gear is completed), based on the information regarding the gear stage drive/reverse direction (d), thereby obtaining motor speed drive/reverse direction information (e) changed to match with the gear stage drive/reverse direction upon completion of a change in the gear stage drive/reverse direction.

The motor speed drive/reverse direction information (e) defines the motor speed drive/reverse direction following the gear stage drive/reverse direction (d). The gear stage drive/reverse direction (d) may be changed such that, at a zero-crossing of the motor speed after the change in the gear stage drive/reverse direction (d), the motor speed drive/reverse direction (e) is converted to be the same as the gear stage drive/reverse direction (d).

In other words, when the motor speed (a) is converted from a positive (+) value to a negative (−) value due to the direction of rotation the motor being changed from the forward rotation to the reverse rotation, the conversion may be performed such that the motor speed drive/reverse direction (e) is the same as the gear stage drive/reverse direction. For example, after the value of the gear stage drive/reverse direction (d) is converted from "+1" to "4", at the zero-crossing "a" of the motor speed (a) from a positive (+) value to a negative (−) value, the value of the motor speed drive/reverse direction (e) is converted from "+1" to "−1".

Similarly, after the value of the gear stage drive/reverse direction (d) is converted from "−1" to "+1", at the zero-crossing "c" of the motor speed (a) from a positive (+) value to a negative (−) value, the value of the motor speed drive/reverse direction (e) is converted from "+1" to "−1". In addition, the direction determining module 29a of the direction corrector 29 may be configured to obtain information regarding a forward/reverse rotation direction of the motor speed indicated by (f), based on the motor speed information (a). The information regarding the forward/reverse rotation direction of the motor speed (f) may be determined as "+1" when the motor rotates forward and "−1" when the motor rotates in reverse.

Subsequently, the direction determining module 29a of the direction corrector 29 may be configured to obtain wheel speed drive/reverse direction information indicated by (g) by multiplying the value "+1" or "−1" of the motor speed drive/reverse direction information (e) with the value "+1" or "−1" of the information regarding the forward/reverse rotation direction of the motor speed (f). In the wheel speed drive/reverse direction information (g), "+1" indicates when the wheel rotates in the drive direction, while "−1" indicates when the wheel rotates in the reverse direction. The values "+1" and "−1" are the direction information indicating the direction of wheel rotation.

Consequently, when the direction corrector 29 adds the direction information depending on the direction of wheel rotation to the wheel speed (not including the direction information indicating the direction of wheel rotation) output by the integrator 28 of the observer module 23, a wheel speed to which the directionality regarding wheel rotation is added, i.e. the final wheel speed observation value according to the present invention, may be obtained. In particular, the direction corrector 29 may be configured to calculate the final wheel speed observation value by multiplying the wheel speed (not including the direction information indicating the direction of wheel rotation) output by the integrator 28 with the value "+1" or "−1" of the wheel speed drive/reverse direction information (g).

In FIG. 3, graph (h) indicates the final wheel speed observation value, i.e. a finally estimated result value observed by adding the directionality by the above-described process according to the present invention. Thus, the wheel speed estimating system and method according to the present invention may obtain more accurate wheel speed information in a relatively-short update period to thus operate the vehicle accordingly. Even when the vehicle is driving at an extremely low speed as in creeping, a more accurate wheel speed value reflecting an actual situation of the wheel may be obtained as real-time information. Accordingly, the overall drivability of the vehicle may be improved.

In particular, in the wheel speed estimating system and method according to the present invention, a wheel speed value including the real-time rotation direction information may be obtained from, for example, a case in which the driver inputs a reverse driving input (i.e. performs an R gear manipulation) during a low-speed driving. Consequently, it may be possible to overcome the problems occurring when only the wheel speed sensors 11 to 14 are used, such as reduced resolution in a low-speed range and absence of information regarding the direction of rotation.

In addition, according to the present invention, it may be possible to improve the accuracy of wheel speed information in a low-speed range while obtaining the direction information of a wheel rotation using existing wheel speed sensors 11 to 14 without using expensive wheel speed sensors. Consequently, the performance of chassis control (e.g. an anti-lock braking system (ABS), a traction control system (TCS), or a hill-start assist control (HAC) system) and the performance of drive system-related control (e.g. transmission control, torque command generation, or four wheel drive control) may be improved and superior drivability may be guaranteed.

According to another exemplary embodiment of the present invention, a speed of a non-drive wheel rather than a drive wheel, a wheel speed value changed from a wheel speed obtaining from global positioning system (GPS) information, or a wheel speed observed based on a vehicle model may be used in place of the wheel speed.

In addition, although the motor speed has been described as an example of the speed of the vehicle driving source connected to the input side of the transmission, the motor speed may be replaced by a rotation speed of the drive system, such as an engine speed, a starter motor speed, or a speed of the transmission input shaft. Furthermore, in place of a P-controller 20 or an I-controller 20 provided using the feedback control value calculator 26, which may be referred to as a feedback error controller, a Kalman filter or the controller 20 obtained by pole-placement may be provided. Any other configuration using an observer error as a feedback (PB) input may be used without limitation.

Although the exemplary embodiments of the present invention have been described for illustrative purposes, the scope of the present invention is not limited thereto. It should be understood that those skilled in the art will appreciate various modifications and improvements without departing from the scope and spirit of the present invention as disclosed in the accompanying claims.

What is claimed is:

1. A system for estimating a wheel speed of a vehicle, wherein the vehicle includes a driving motor and a transmission, and performs reverse movement using the transmission, the system comprising:
   a wheel speed sensor configured to detect a rotation speed of a wheel of the vehicle;
   a motor speed sensor configured to detect a speed of the driving motor; and
   a controller configured to receive a signal of the wheel speed sensor, a signal of the motor speed sensor, and information regarding a gear stage indicating a current gear stage status of the transmission, and estimate a wheel speed to which directionality of wheel rotation is added,
   wherein the controller includes a direction determining module, configured to obtain direction information indicating a direction of wheel rotation from motor speed information obtained from the signal of the motor speed sensor and the gear stage information, and
   wherein the controller is configured to estimate the wheel speed including the directionality of wheel rotation, using real-time direction information obtained by the direction determining module and the signal of the wheel speed sensor, when the gear stage changes to a reverse gear by manipulating a shift lever during forward movement of the vehicle at a low speed or the gear change changes to a drive gear during reverse movement of the vehicle at the low speed.

2. The system according to claim 1, wherein the direction determining module is configured to obtain information regarding a drive/reverse direction of the gear stage, assigning "+1" to a drive movement and "−1" to a reverse movement, from gear stage information after termination of a neutral range.

3. The system according to claim 2, wherein the direction determining module is configured to determine information regarding a drive/reverse direction of the motor speed, which follows the information regarding a drive/reverse direction of the gear stage at a point in time at which a rotation direction of the driving motor is changed, as one of "+" and "−1".

4. The system according to claim 3, wherein the direction determining module is configured to obtain information regarding a forward/reverse rotation direction of the motor speed, assigning "+1" to a forward rotation of the driving motor and "−1" to a reverse rotation of the driving motor.

5. The system according to claim 4, wherein the direction determining module is configured to determine real-time direction information of the wheel rotation, that is information regarding a drive/reverse direction of the wheel speed, from a value obtained by multiplying the determined the information regarding the drive/reverse direction of the motor speed with the obtained information regarding a forward/reverse rotation direction of the motor speed.

6. The system according to claim 2, wherein the direction determining module is configured to check a point in time at which the rotation direction of the driving motor is changed after gear stage shifting, based on the motor speed information obtained by the signal of the motor speed sensor, and at a point in time at which the rotation direction of the driving motor is changed, the direction determining module is configured to determine the information regarding the drive/reverse direction of the motor speed to be the same value as the information regarding the drive/reverse direction of the gear stage.

7. The system according to claim 6, wherein the direction determining module is configured to check a point in time of the motor speed, obtained by the signal of the motor speed sensor, zero-crossing from a positive "+" value to a negative "−" value, as a point in time at which the rotation direction of the driving motor is changed after the gear stage shifting, and at a point in time of the motor speed zero-crossing from the positive "+" value to the negative "−" value, the direction determining module is configured to determine the information regarding the drive/reverse direction of the motor speed to be the same value as the information regarding the drive/reverse direction of the gear stage.

8. The system according to claim 6, wherein the direction determining module is configured to maintain the information regarding the drive/reverse direction of the motor speed, which is determined to be the same value as the information regarding the drive/reverse direction of the gear stage, until reaching a next point in time at which the rotation direction of the driving motor is changed after gear stage shifting again.

9. The system according to claim 2, wherein the controller is configured to estimate the wheel speed to which the directionality of wheel rotation, by multiplying the information regarding the drive/reverse direction of the wheel speed determined by the direction determining module with the rotation speed of the wheel obtained from the signal of the wheel speed sensor.

10. The system according to claim 1, wherein the wheel speed sensor includes an encoder.

11. The system according to claim 1, wherein the motor speed sensor includes a resolver.

12. A method for estimating a wheel speed of a vehicle, wherein the vehicle includes a driving motor and a transmission and performs reverse movement using the transmission, the method comprising:
receiving, by a controller, a signal of a wheel speed sensor, a signal of a motor speed sensor, and information regarding a gear stage indicating a current gear stage status of the transmission;
obtaining, by the controller, motor speed information obtained from the signal of the motor speed sensor by a direction determining module and direction information indicating a direction of wheel rotation from the information regarding the gear stage; and
estimating, by the controller, a wheel speed to which the directionality of wheel rotation is added, using real-time direction information obtained by the signal of the wheel speed sensor and by the direction determining module, when the gear stage changes to a reverse gear by manipulating a shift lever during forward movement of the vehicle at a low speed or the gear change changes to a drive gear during reverse movement of the vehicle at the low speed.

13. The method according to claim 12, wherein the obtaining of the direction information includes:
obtaining, by, the controller, information regarding a drive/reverse direction of the gear stage, assigning "+1" to a forward movement and "−1" to a reverse movement, from gear stage information after termination of a neutral range;
determining, by, the controller, information regarding a drive/reverse direction of the motor speed, which follows the information regarding the drive/reverse direction of the gear stage at a point in time at which the rotation direction of the driving motor is changed, as one of "+1" and "−1";
obtaining, by, the controller, information regarding a forward/reverse rotation direction of the motor speed, assigning "+1" to a forward rotation of the driving motor and "−1" to a reverse rotation of the driving motor; and
determining, by, the controller, the real-time direction information of the wheel rotation, that is information regarding a drive/reverse direction of the wheel speed, from a value obtained by multiplying the determined information regarding the drive/reverse direction of the motor speed with the obtained the information regarding the forward/reverse rotation direction of the motor speed.

14. The method according to claim 13, wherein, at the determining of the information regarding the drive/reverse direction of the motor speed, a point in time at which a rotation direction of the driving motor is changed after gear stage shifting is checked, based on the motor speed information obtained from the signal of the motor speed sensor, and at the point in time at which the rotation direction of the driving motor is changed, the information regarding the drive/reverse direction of the motor speed is determined to be the same value as the information regarding the drive/reverse direction of the gear stage.

15. The method according to claim 14, wherein, as the point in time at which the rotation direction of the driving motor is changed after gear stage shifting, a point in time of the motor speed obtained by the signal of the motor speed sensor zero-crossing, from a positive "+" value to a negative "−" value, is checked, and at the point in time of the motor speed zero-crossing from the positive "+" value to the negative "−", the information regarding the drive/reverse direction of the motor speed is determined to be the same value as the information regarding the drive/reverse direction of the gear stage.

16. The method according to claim 14, wherein the information regarding the drive/reverse direction of the motor speed, determined to be the same value as the information regarding the drive/reverse direction of the gear stage, is maintained until reaching a next point in time as which the rotation direction of the driving motor is changed after gear stage shifting again.

17. The method according to claim 13, further comprising:

estimating, by the controller, a wheel speed, to which directionality of wheel rotation is added, by multiplying the information regarding the drive/reverse direction of wheel speed determined by the direction determining module with a rotation speed of a wheel obtained from the signal of the wheel speed sensor.

* * * * *